(12) United States Patent
Ohira et al.

(10) Patent No.: US 12,456,783 B2
(45) Date of Patent: Oct. 28, 2025

(54) ENERGY STORAGE MODULE

(71) Applicants: TOYOTA JIDOSHA KABUSHIKI KAISHA, Toyota (JP); AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuki Ohira, Nisshin (JP); Hideo Takahashi, Osaka (JP); Daiji Yoshito, Osaka (JP)

(73) Assignees: TOYOTA JIDOSHA KABUSHIKI KAISHA, Toyota (JP); AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 492 days.

(21) Appl. No.: 18/158,575

(22) Filed: Jan. 24, 2023

(65) Prior Publication Data

US 2023/0307797 A1  Sep. 28, 2023

(30) Foreign Application Priority Data

Mar. 23, 2022  (JP) ................... 2022-046260

(51) Int. Cl.
*H01M 50/507* (2021.01)
*H01M 50/503* (2021.01)

(52) U.S. Cl.
CPC ....... *H01M 50/507* (2021.01); *H01M 50/503* (2021.01)

(58) Field of Classification Search
CPC .......................... H01M 50/503; H01M 50/507
See application file for complete search history.

(56) References Cited

U.S. PATENT DOCUMENTS

2014/0087591 A1  3/2014  Ikeda et al.
2021/0159572 A1  5/2021  Kubota et al.

FOREIGN PATENT DOCUMENTS

| JP | 2018-170254 A | 11/2018 |
| JP | 2021-132016 A | 9/2021 |
| WO | 2013/002328 A1 | 1/2013 |
| WO | 2019/054079 A1 | 3/2019 |

*Primary Examiner* — Sarah A. Slifka
(74) *Attorney, Agent, or Firm* — Oliff PLC (57) ABSTRACT

An energy storage module includes a plurality of cells, a first end plate, a second end plate, and a busbar module. The busbar module includes a plurality of busbars and a busbar case that holds the busbars. The busbar case includes a first end case, a second end case, and a connection portion. The first end case engages with the first end plate. The second end case is located to be separate from the first end case in the first direction, and engages with the second end plate. The connection portion connects the first end case and the second end case to each other. The connection portion includes a first expandable portion that is expandable in the first direction.

9 Claims, 6 Drawing Sheets

ENERGY STORAGE MODULE

CROSS-REFERENCE TO RELATED APPLICATION

This application claims priority to Japanese Patent Application No. 2022-046260 filed on Mar. 23, 2022, incorporated herein by reference in its entirety.

BACKGROUND

1. Technical Field

The present disclosure relates to energy storage modules.

2. Description of Related Art

Japanese Unexamined Patent Application Publication No. 2021-132016 (JP 2021-132016 A) discloses an energy storage device including a plurality of energy storage elements, a pair of end plates, a busbar, and a busbar frame. The energy storage element includes electrode terminals protruding in a first direction. The end plates are disposed at such positions that the end plates interpose the energy storage elements in a second direction that intersects with the first direction. The busbar frame is an insulating member that can regulate the position of the busbar. The busbar frame is disposed to extend in the first direction with respect to the energy storage elements, and is attached to both end plates. The busbar frame is positioned with respect to the energy storage elements. The busbar is thus positioned with respect to the energy storage elements and bonded to the electrode terminals of the energy storage elements.

SUMMARY

In energy storage modules of the related art, the total length of a plurality of cells or length of a busbar case (busbar frame) in the direction in which a pair of end plates is located next to each other may vary from the design dimension within the range of tolerance. When these lengths vary relatively significantly from their design dimensions, it may be difficult to engage the end plates with the busbar case (busbar frame) during manufacturing of the energy storage module.

The present disclosure provides an energy storage module in which a busbar case can be easily engaged with end plates.

An aspect of the present disclosure relates to an energy storage module including a plurality of cells, a first end plate, a second end plate, and a busbar module. The plurality of cells is arranged side by side in a first direction. The first end plate is located next to the plurality of cells on one side of the plurality of cells in the first direction. The second end plate is located next to the plurality of cells on an opposite side of the cells from the first end plate. The busbar module is located on one side of the plurality of cells, the first end plate, and the second end plate in a second direction orthogonal to the first direction. Each of the cells includes a pair of external terminals. The busbar module includes a plurality of busbars and a busbar case. The plurality of busbars is configured to electrically connect the external terminals located adjacent to each other in the first direction. The busbar case is configured to hold the plurality of busbars. The busbar case includes a first end case, a second end case, and a connection portion. The first end case engages with the first end plate. The second end case is located to be separate from the first end case in the first direction, and engages with the second end plate. The connection portion is configured to connect the first end case and the second end case to each other. The connection portion includes a first expandable portion that is expandable in the first direction.

According to the above configuration, even when the total length of the cells in the first direction varies relatively significantly from the design dimension, the busbar case can be easily engaged with the first end plate and the second end plate by expanding the first expandable portion.

In the energy storage module according to the aspect of the present disclosure, the first expandable portion may be a hinge or a member in a shape of a flat spring.

According to the energy storage module with the above configuration, the first expandable portion is a hinge or a member in the shape of a flat spring. Therefore, the first expandable portion is expandable in the first direction.

In the energy storage module according to the aspect of the present disclosure, the first expandable portion may be a connection mechanism configured to allow a central case configured to connect to the first end case and the first end case to slide with respect to each other in the first direction.

According to the energy storage module with the above configuration, the first expandable portion is a connection mechanism that allows the central case and the first end case to slide with respect to each other in the first direction. Therefore, the first expandable portion is expandable in the first direction.

In the energy storage module according to the aspect of the present disclosure, the connection portion may further include a central case and a second expandable portion. The central case may be configured to connect to the first end case via the first expandable portion. The second expandable portion may be configured to connect the central case and the second end case to each other, and may be configured to be expandable in the first direction.

In the energy storage module according to the aspect of the present disclosure, the second expandable portion may be a hinge or a member in a shape of a flat spring.

According to the energy storage module with the above configuration, the second expandable portion is a hinge or a member in the shape of a flat spring. Therefore, the second expandable portion is expandable in the first direction.

According to the energy storage module with the above configuration, even when the total length of the cells in the first direction varies relatively significantly from the design dimension, the busbar case can be easily engaged with the first end plate and the second end plate by expanding the second expandable portion in addition to the first expandable portion.

In the energy storage module with the above configuration, the central case may include a protruding portion protruding in the second direction. The protruding portion may be located between a pair of cells out of the plurality of cells.

According to the energy storage module with the above configuration, the protruding portion is placed between the cells during manufacturing of the energy storage module. This makes it easy to determine the position of the central case relative to the cells in the first direction.

In the energy storage module with the above configuration, the energy storage module may further include a center plate located between the pair of cells. The center plate may include a central engaged portion that engages with the protruding portion.

According to the energy storage module with the above configuration, the protruding portion is engaged with the central engaged portion during manufacturing of the energy storage module. This makes it easier to determine the position of the central case relative to the cells in the first direction.

In the energy storage module with the above configuration, the protruding portion may be fitted between the pair of cells so as to contact the pair of cells.

According to the energy storage module with the above configuration, the protruding portion is fitted between the cells during manufacturing of the energy storage module. This makes it easier to determine the position of the central case relative to the cells in the first direction.

In the energy storage module according to the aspect of the present disclosure, the first end plate may include a base and a retained portion. The base may extend in the second direction. The retained portion may extend in the first direction from the base. The retained portion may include a through hole extending in the second direction. The first end case may include a columnar portion and a retaining portion. The columnar portion may extend in the second direction, and may be inserted through the through hole. The retaining portion may be located at a distal end of the columnar portion, and may be configured to retain the retained portion in the second direction.

According to the energy storage module with the above configuration, the busbar case and the first end plate can be more firmly engaged in the second direction.

According to the energy storage module of the present disclosure, the busbar case can be easily engaged with the end plates.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an energy storage module according to an embodiment of the present disclosure will be described. In the following description of the embodiment, the same or corresponding portions are denoted by the same signs throughout the drawings, and description thereof will not be repeated.

Figure 1:
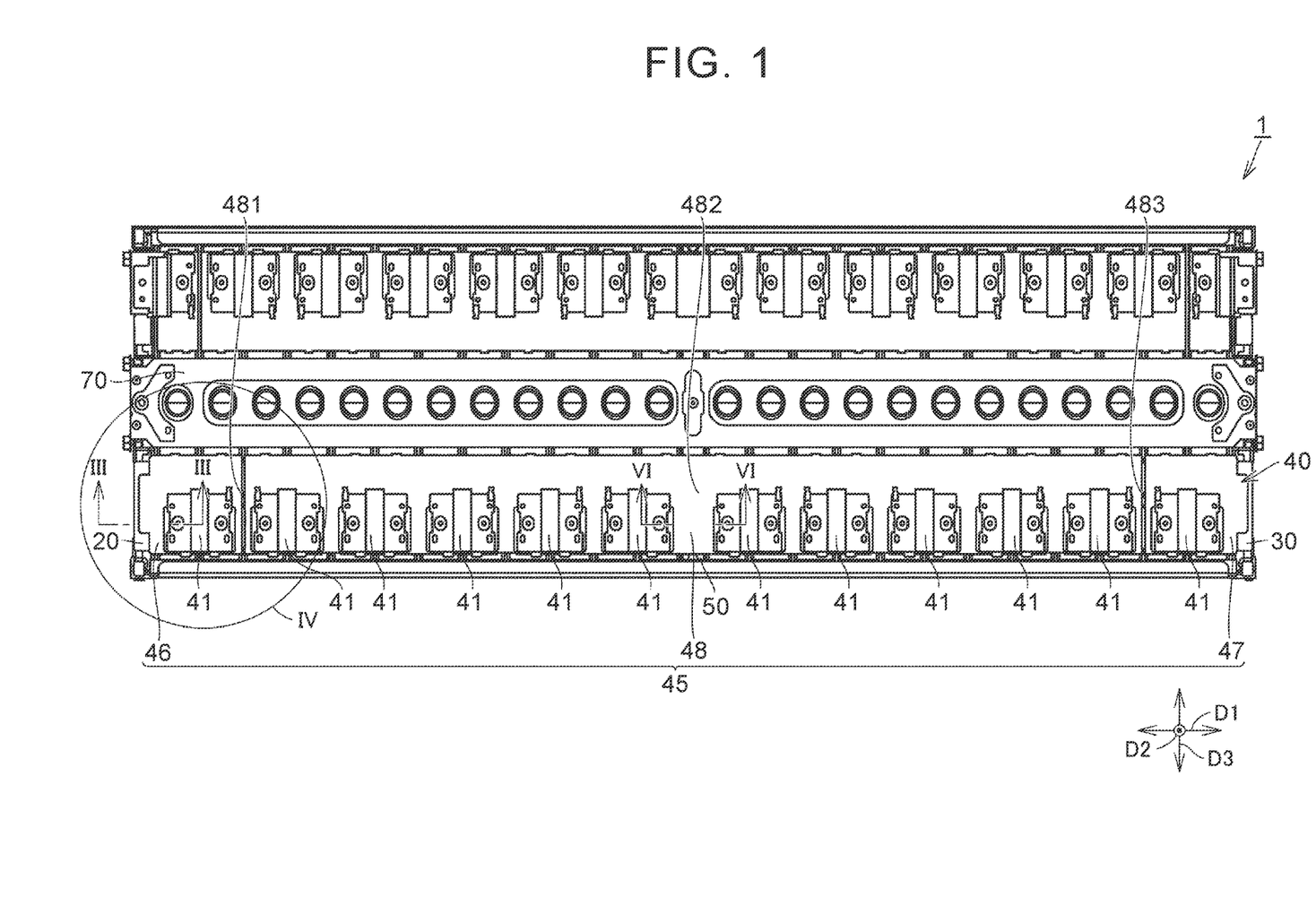
FIG. 1 is a plan view of an energy storage module according to an embodiment of the present disclosure.
Figure 2:
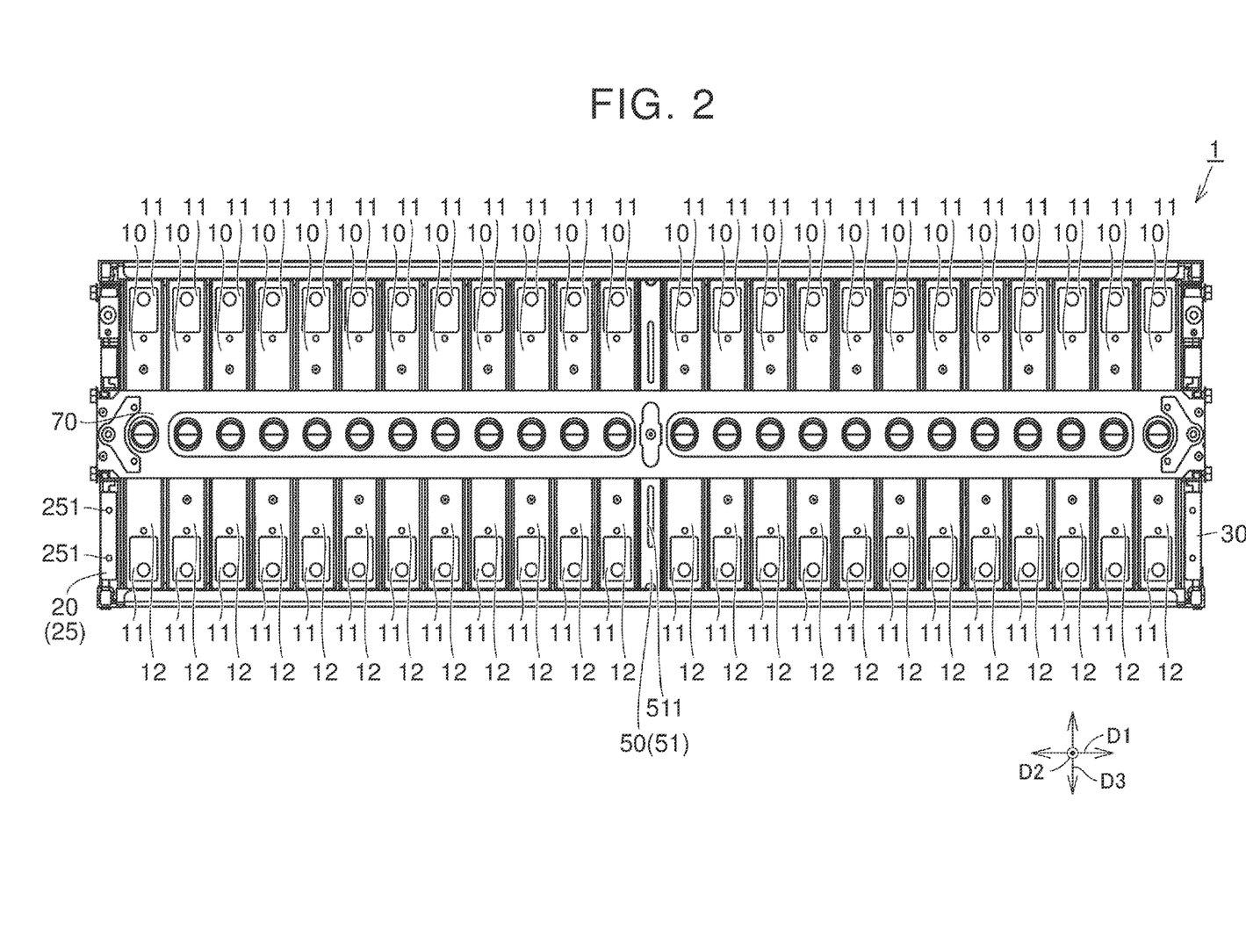
FIG. 2 is a plan view of the energy storage module according to the embodiment of the present disclosure, in which a part of the configuration is not shown.

FIG. 1 is a plan view of an energy storage module according to an embodiment of the present disclosure. FIG. 2 is a plan view of the energy storage module according to the embodiment of the present disclosure, in which a part of the configuration is not shown. As shown in FIGS. 1 and 2, an energy storage module 1 according to an embodiment of the present disclosure includes a plurality of cells 10, a first end plate 20, a second end plate 30, a busbar module 40, and a center plate 50. The busbar module 40 is not shown in the energy storage module 1 of FIG. 2. The energy storage module 1 is mounted on, for example, a vehicle.

The cells 10 are, for example, lithium-ion cells. The cells 10 are arranged side by side in a first direction D1. Each of the cells 10 includes a pair of external terminals 11 arranged side by side in a third direction D3 orthogonal to the first direction D1. One of the external terminals 11 is a positive terminal, and the other is a negative terminal.

Each of the cells 10 further includes a case 12 substantially in the shape of a rectangular parallelepiped. The case 12 houses electrodes etc. The case 12 is made of aluminum etc. Each of the external terminals 11 protrudes from the case 12 in a second direction D2 orthogonal to both the first direction D1 and the third direction D3.

Each of the cells 10 may be a cell with a liquid electrolyte contained in the case 12. Each of the cells 10 may be a cell (all-solid-state cell) with a solid electrolyte contained in the case 12.

The first end plate 20 is disposed next to the cells 10 on one side of the cells in the first direction D1. The first end plate 20 is made of an insulating material such as, for example, synthetic resin.

Figure 3:
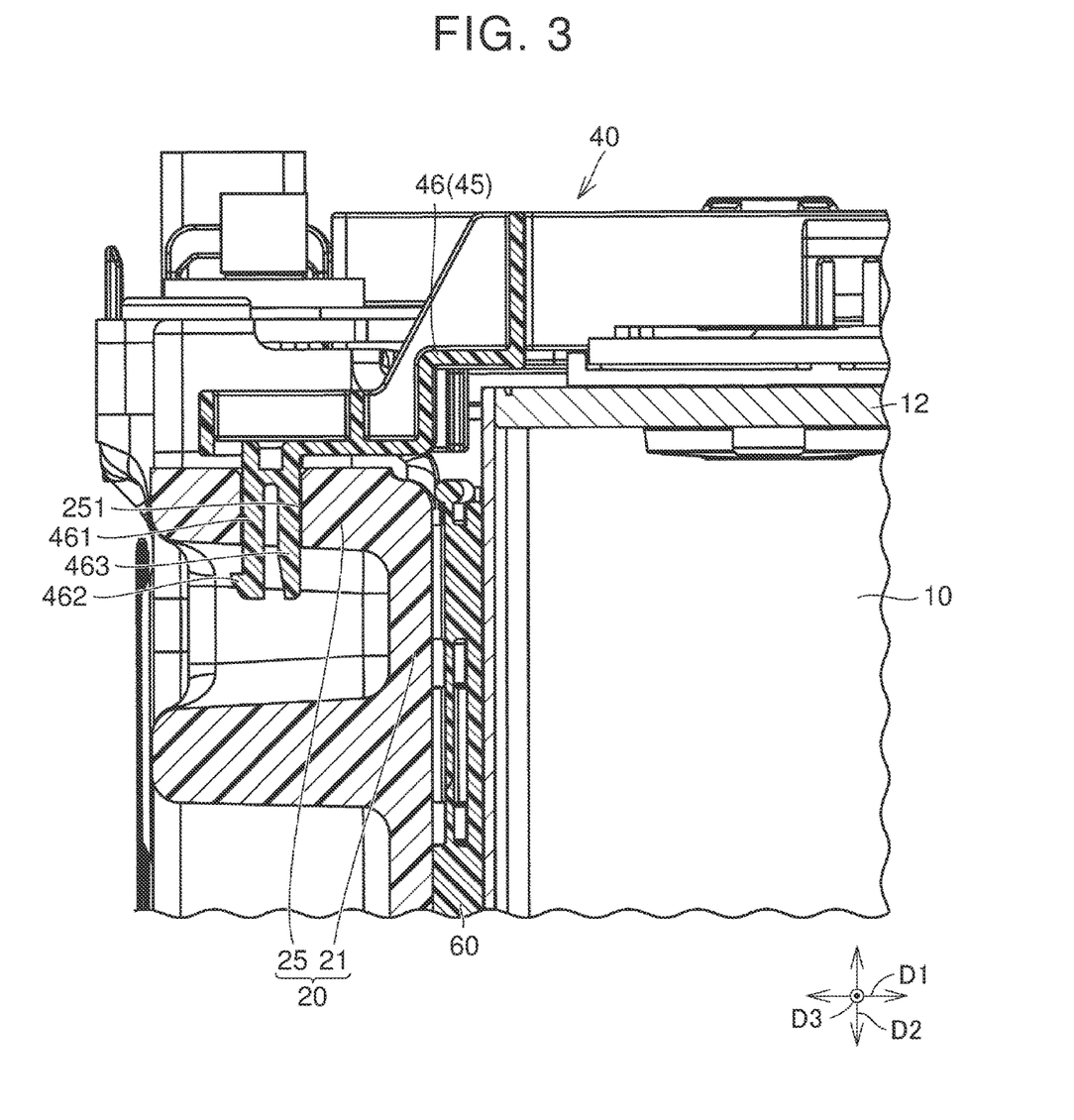
FIG. 3 is a partial cross-sectional view of the energy storage module of FIG. 1 as viewed in the direction of arrows III-III.

FIG. 3 is a partial cross-sectional view of the energy storage module 1 of FIG. 1 as viewed in the direction of arrows III-III. As shown in FIG. 3, the first end plate 20 includes a base 21 and a retained portion 25.

The base 21 extends in the second direction D2. The outer shape of the base 21 is a flat plate extending in both the second direction D2 and the third direction D3.

The retained portion 25 extends in the first direction D1 from the base 21. The retained portion 25 extends toward the opposite side of the base 21 from the cells 10. The retained portion 25 extends from the end in the second direction D2 of the base 21. The retained portion 25 has a through hole 251 extending in the second direction D2. As shown in FIG. 2, the retained portion 25 has a plurality of the through holes 251. The through holes 251 are located side by side in the third direction D3.

The second end plate 30 is disposed next to the cells 10 on the opposite side of the cells 10 from the first end plate 20. The second end plate 30 is placed so as to be substantially line-symmetrical with the first end plate 20 with respect to the cells 10. The outer shape of the second end plate 30 is substantially line-symmetrical with the outer shape of the first end plate 20 in the first direction D1.

Figure 4:
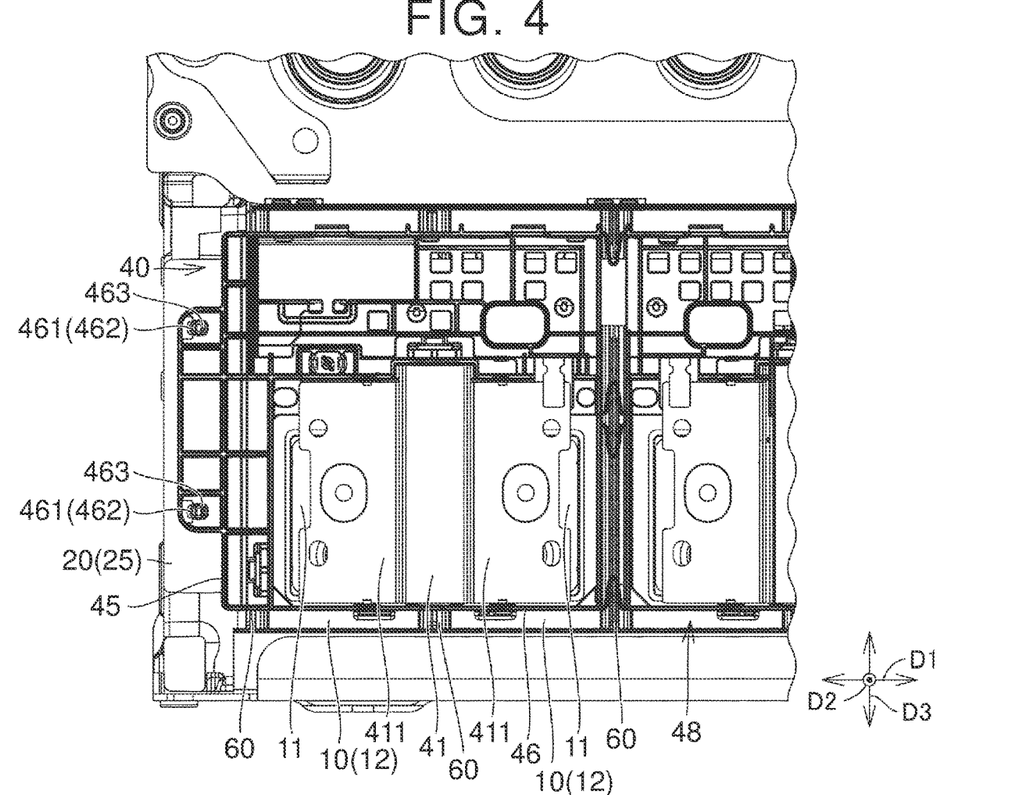
FIG. 4 is a partial enlarged plan view of a region IV in FIG. 1.
Figure 5:
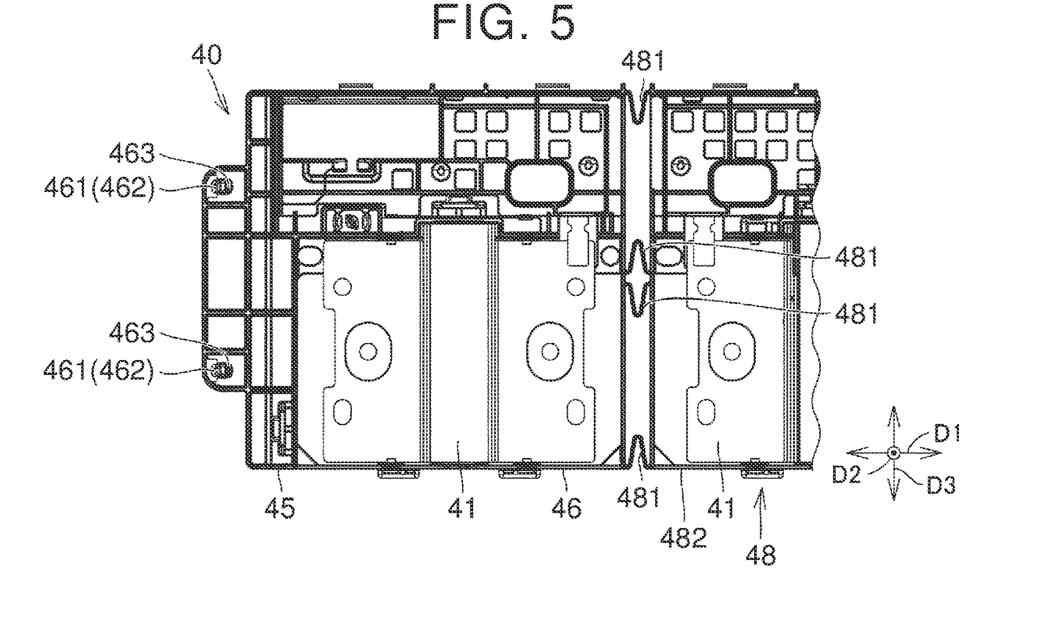
FIG. 5 is a partial plan view showing a part of a busbar module included in the energy storage module.

FIG. 4 is a partial enlarged plan view of a region IV in FIG. 1. FIG. 5 is a partial plan view showing a part of the busbar module 40. As shown in FIGS. 1 to 5, the busbar module 40 is disposed on one side of the cells 10, the first end plate 20, and the second end plate 30 in the second direction D2. The busbar module 40 includes a plurality of busbars 41 and a busbar case 45. Only the outer shape of the busbar case 45 as viewed in plan is schematically shown in FIG. 1.

The busbars 41 electrically connect the external terminals 11 located adjacent to each other in the first direction D1. Each of the busbars 41 electrically connects the positive terminal of one cell 10 and the negative terminal of another cell 10 located adjacent to the one cell 10.

Each of the busbars 41 includes a pair of welded portions 411. The welded portions 411 are located side by side in the first direction D1. The outer shape of the welded portion 411 is a flat plate extending in the first direction D1 and the third direction D3. The welded portions 411 are welded to the external terminals 11, so that the busbar 41 and the external terminals 11 are electrically connected to each other.

The busbar case 45 holds the busbars 41. The busbar case 45 is made of an insulating material such as, for example, synthetic resin. The busbar case 45 includes a first end case 46, a second end case 47, and a connection portion 48. In the busbar case 45, the first end case 46, the second end case 47, and the connection portion 48 are a single mold.

The first end case 46 holds a busbar 41 so as to retain the busbar 41 in the first direction D1 and the third direction D3. The first end case 46 holds at least one busbar 41. In the present embodiment, the first end case 46 holds only one busbar 41. The first end case 46 engages with the first end plate 20.

The first end case 46 includes a columnar portion 461, a retaining portion 462, and a contact portion 463. The columnar portion 461 extends in the second direction D2 and is inserted through the through hole 251. The retaining portion 462 is located at the distal end of the columnar portion 461, and can retain the retained portion 25 in the second direction D2. The outer shape of the retaining portion 462 is a hook. The contact portion 463 contacts at least the through hole 251 in the first direction D1. The contact portion 463 extends in the second direction D2 and is inserted through the through hole 251. The contact portion 463 is located to be separate from the columnar portion 461 in the first direction D1. The retaining portion 462 protrudes from the columnar portion 461 on the opposite side of the columnar portion 461 from the contact portion 463. The retaining portion 462 has a tapered surface that is tilted toward the contact portion 463 as it gets closer to the distal end of the columnar portion 461. This configuration facilitates insertion of the columnar portion 461, the retaining portion 462, and the contact portion 463 through the through hole 251. As described above, the first end case 46 engages with the first end plate 20 by a so-called snap-fit feature.

The first end case 46 includes a plurality of the columnar portions 461, a plurality of the retaining portions 462, and a plurality of the contact portions 463 corresponding to the through holes 251 of the first end plate 20.

The second end case 47 is located to be separate from the first end case 46 in the first direction D1. The second end case 47 holds a busbar 41 so as to retain the busbar 41 in the first direction D1 and the third direction D3. The second end case 47 holds at least one busbar 41. In the present embodiment, the second end case 47 holds only one busbar 41. The second end case 47 engages with the second end plate 30.

The second end case 47 is located so as to be substantially line-symmetrical with the first end case 46 with respect to the connection portion 48. The outer shape of the second end case 47 is substantially line-symmetrical with the outer shape of the first end case 46 in the first direction D1.

The connection portion 48 connects the first end case 46 and the second end case 47 to each other in the first direction D1. The connection portion 48 includes a first expandable portion 481, a central case 482, and a second expandable portion 483.

The first expandable portion 481 is expandable in the first direction D1. The first expandable portion 481 is in the shape of a flat spring and is elastically deformable in the first direction D1. The first expandable portion 481 is configured to bias the first end case 46 and the central case 482 in the direction in which the first end case 46 and the central case 482 are separated from each other in the first direction D1. The first expandable portion 481 is thus configured to bias the first end case 46 and the second end case 47 in the direction in which the first end case 46 and the second end case 47 are separated from each other in the first direction D1. The connection portion 48 includes a plurality of the first expandable portions 481. The first expandable portions 481 are located side by side in the third direction D3.

The specific shape of the first expandable portion 481 is not limited to the flat spring. The first expandable portion 481 may be a hinge, or may be a connection mechanism that allows the first end case 46 and the central case 482 to slide with respect to each other in the first direction D1.

The central case 482 connects to the first end case 46 via the first expandable portions 481. The central case 482 holds a plurality of busbars 41 so as to retain the busbars 41 in the first direction D1 and the third direction D3. The central case 482 is longer in dimension in the first direction D1 than the first end case 46 and the second end case 47. This configuration reduces the possibility that the first end case 46 and the second end case 47 may hang down from the central case 482 when the central case 482 is held during manufacturing of the energy storage module 1, and makes it easy to handle the busbar module 40. It is preferable that the dimension in the first direction D1 of the central case 482 be twice or more the dimension in the first direction D1 of the first end case 46 and the dimension in the first direction D1 of the second end case 47.

Figure 6:
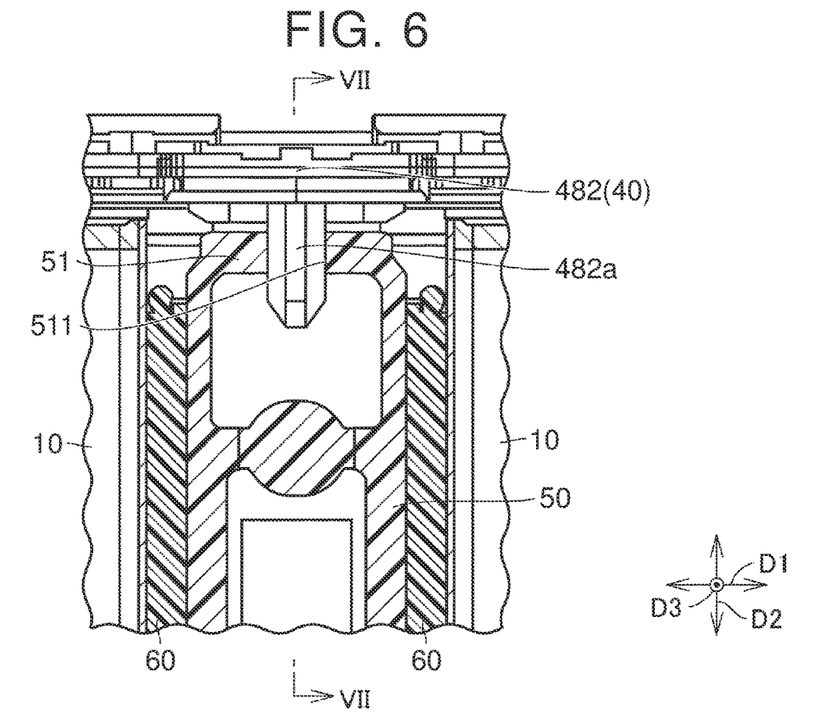
FIG. 6 is a partial cross-sectional view of the energy storage module of FIG. 1 as viewed in the direction of arrows VI-VI.
Figure 7:
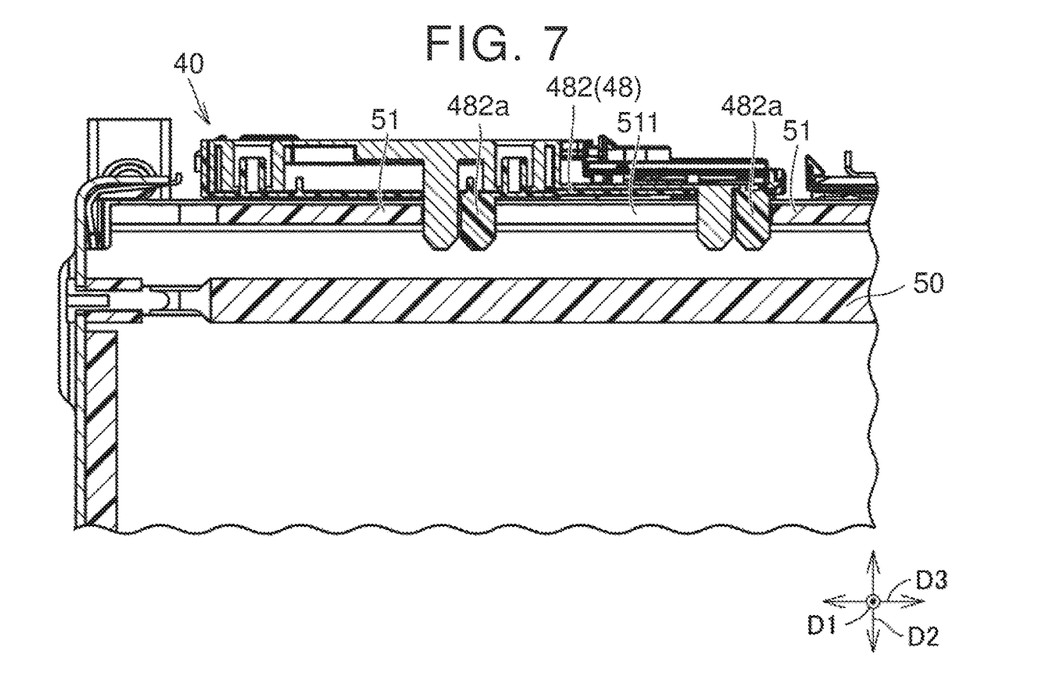
FIG. 7 is a partial cross-sectional view of the energy storage module of FIG. 6 as viewed in the direction of arrows VII-VII.

FIG. 6 is a partial cross-sectional view of the energy storage module 1 of FIG. 1 as viewed in the direction of arrows VI-VI. FIG. 7 is a partial cross-sectional view of the energy storage module 1 of FIG. 6 as viewed in the direction of arrows VII-VII. As shown in FIGS. 6 and 7, the central case 482 has a protruding portion 482a protruding in the second direction D2. The protruding portion 482a is located between a pair of cells 10 out of the plurality of cells 10. In the present embodiment, the outer shape of the protruding portion 482a is approximately a cruciform as viewed in the second direction D2. The central case 482 has a plurality of the protruding portions 482a. The protruding portions 482a are located side by side in the third direction D3.

The second expandable portion 483 connects the central case 482 and the second end case 47 to each other, and is expandable in the first direction D1. The second expandable portion 483 is also a hinge or a member in the shape of a flat spring like the first expandable portion 481, and is elastically deformable in the first direction D1. The second expandable portion 483 is configured to bias the second end case 47 and the central case 482 in the direction in which the second end case 47 and the central case 482 are separated from each other in the first direction D1. The second expandable portion 483 is thus configured to bias the first end case 46 and the second end case 47 in the direction in which the first end case 46 and the second end case 47 are separated from each other in the first direction D1. The connection portion 48 includes a plurality of the second expandable portions 483. The second expandable portions 483 are located side by side in the third direction D3. Like the first expandable portion 481, the shape of the second expandable portion 483 is not limited to the flat spring.

The center plate 50 is located between a pair of cells 10. The center plate 50 is made of an insulating material such as, for example, synthetic resin.

The center plate 50 includes a central engaged portion 51 that engages with the protruding portion 482a. The central engaged portion 51 is located at the end on the central case 482 side of the center plate 50. The engaged portion 51 has a hole 511 extending in the second direction D2. The protruding portion 482a is inserted through the hole 511. The protruding portion 482a is fixed in position relative to the center plate 50 in the first direction D1 by contacting the hole 511 in the first direction D1.

The energy storage module 1 further includes a plurality of spacers 60. The spacers 60 are located between the cells 10, between the cell 10 and the first end plate 20, between the cell 10 and the second end plate 30, and between the center plate 50 and the cell in the first direction D1. The spacers 60 are made of an insulating material such as, for example, synthetic rubber.

The energy storage module 1 further includes a restraining band 70. The restraining band 70 extends in the first direction D1. The restraining band 70 engages with the first end plate 20 and the second end plate 30. The restraining band 70 may be configured to apply a restraining force in the direction in which the cells 10 arranged side by side in the first direction D1, the first end plate 20, the second end plate 30, the center plate 50, and the spacers 60 are compressed in the first direction D1. The positions of the cells 10, the first end plate 20, the second end plate 30, the center plate 50, and the spacers 60 relative to each other are thus determined.

As described above, the energy storage module 1 according to the embodiment of the present disclosure includes the cells 10, the first end plate 20, the second end plate 30, and the busbar module 40. The cells 10 are arranged side by side in the first direction D1. Each of the cells 10 includes a pair of external terminals 11. The first end plate is disposed next to the cells 10 on one side of the cells 10 in the first direction D1. The second end plate 30 is disposed next to the cells 10 on the opposite side of the cells 10 from the first end plate 20. The busbar module 40 is disposed on one side of the cells 10, the first end plate 20, and the second end plate 30 in the second direction D2 orthogonal to the first direction D1. The busbar module 40 includes the busbars 41 and the busbar case 45. The busbars 41 electrically connect the external terminals 11 located adjacent to each other in the first direction D1. The busbar case 45 holds the busbars 41. The busbar case 45 includes the first end case 46, the second end case 47, and the connection portion 48. The first end case 46 engages with the first end plate 20. The second end case 47 is located to be separate from the first end case 46 in the first direction D1, and engages with the second end plate 30. The connection portion 48 connects the first end case 46 and the second end case 47 to each other. The connection portion 48 includes the first expandable portion 481 that is expandable in the first direction D1.

According to the above configuration, even when the total length of the cells in the first direction D1 varies relatively significantly from the design dimension, the busbar case 45 can be easily engaged with the first end plate 20 and the second end plate 30 by expanding the first expandable portion 481.

In one embodiment of the present disclosure, the connection portion 48 further includes the central case 482 and the second expandable portion 483. The central case 482 connects to the first end case 46 via the first expandable portion 481. The second expandable portion 483 connects the central case 482 and the second end case 47 to each other, and is expandable in the first direction D1.

According to the above configuration, even when the total length of the cells in the first direction D1 varies relatively significantly from the design dimension, the busbar case 45 can be easily engaged with the first end plate 20 and the second end plate 30 by expanding the second expandable portion 483 in addition to the first expandable portion 481.

In one embodiment of the present disclosure, the first end plate 20 includes the base 21 and the retained portion 25. The base 21 extends in the second direction D2. The retained portion 25 extends in the first direction D1 from the base 21. The retained portion has the through hole 251 extending in the second direction D2. The first end case 46 includes the columnar portion 461 and the retaining portion 462. The columnar portion 461 extends in the second direction D2 and is inserted through the through hole 251. The retaining portion 462 is located at the distal end of the columnar portion 461, and can retain the retained portion 25 in the second direction D2.

According to the above configuration, the busbar case 45 and the first end plate 20 can be more firmly engaged in the second direction D2. When the first expandable portion 481 is elastically deformed in the first direction D1, the first end case 46 is less likely to be separated from the first end plate 20 by the biasing force received from the first expandable portion 481, and the first end case 46 and the first end plate 20 are less likely to be disengaged. The first end case 46 can thus be easily attached to the first end plate 20.

In one embodiment of the present disclosure, the central case 482 has the protruding portion 482a protruding in the second direction D2. The protruding portion 482a is located between a pair of cells 10 out of the plurality of cells 10.

According to the above configuration, the protruding portion 482a is placed between the cells 10 during manufacturing of the energy storage module 1. This makes it easy to determine the position of the central case 482 relative to the plurality of cells 10 in the first direction D1.

In one embodiment of the present disclosure, the energy storage module 1 further includes the center plate 50 located between the pair of cells 10. The center plate 50 includes the central engaged portion 51 that engages with the protruding portion 482a.

According to the above configuration, the protruding portion 482a is engaged with the central engaged portion 51 during manufacturing of the energy storage module 1. This makes it easier to determine the position of the central case 482 relative to the plurality of cells 10 in the first direction D1.

Figure 8:
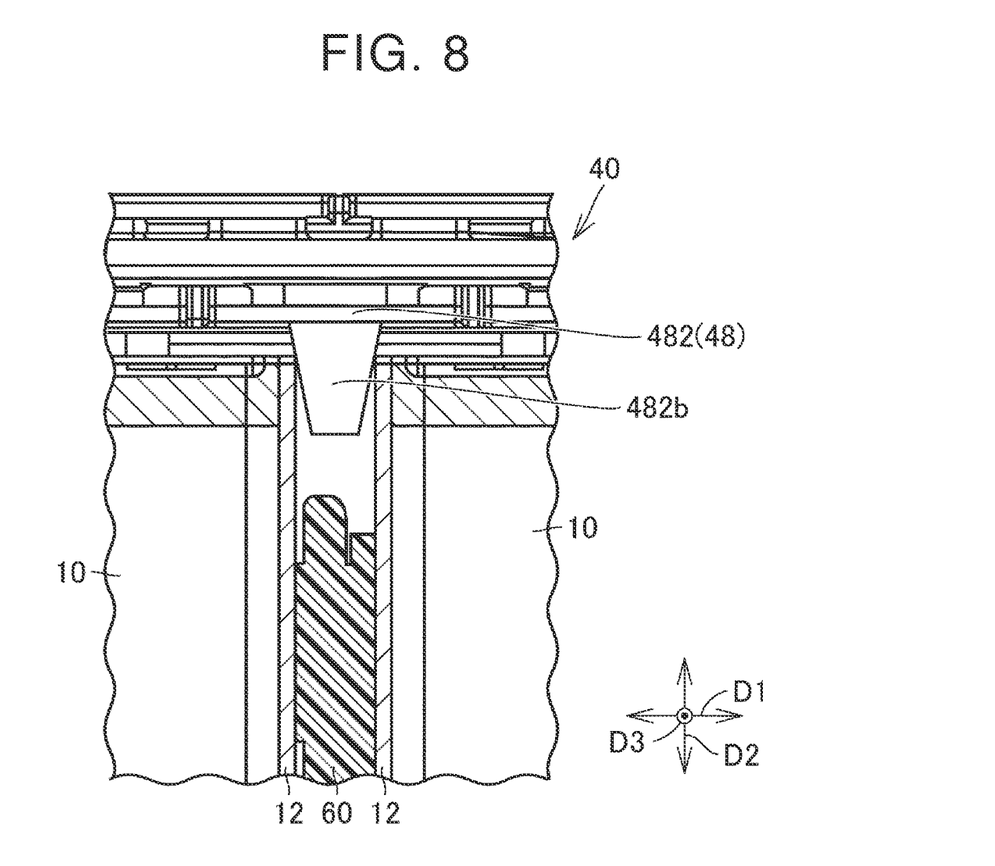
FIG. 8 is a partial cross-sectional view of an energy storage module according to a modification of the embodiment of the present disclosure.

The protruding portion 482a is not limited to the structure described above, and may not be engaged with the center plate 50. FIG. 8 is a partial cross-sectional view of an energy storage module according to a modification of the embodiment of the present disclosure. In the modification of the embodiment of the present disclosure, a protruding portion 482b is fitted between a pair of cells 10 so as to contact the pair of cells 10. The protruding portion 482a is thus fitted between the pair of cells 10 during manufacturing of the energy storage module 1. This makes it easier to determine the position of the central case 482 relative to the plurality of cells 10 in the first direction D1.

The protruding portion 482b has such a tapered shape that the lateral dimension of the protruding portion 482b, namely the dimension in the first direction D1 of the protruding portion 482b, becomes gradually smaller toward its distal end in the direction in which the protruding portion 482b protrudes. This makes it easy to fit the protruding portion 482b between the pair of cells 10. The center plate 50 may include the protruding portion 482b of the modification that is different from the protruding portion 482a, in addition to the protruding portion 482a.

The embodiment disclosed herein should be considered to be illustrative in all respects and not restrictive. The scope of the present disclosure is defined by the claims rather than by the above description, and is intended to include all modifications within the meaning and scope equivalent to those of the claims.

What is claimed is:

1. An energy storage module comprising:
   a plurality of cells arranged side by side in a first direction;
   a first end plate located next to the plurality of cells on one side of the plurality of cells in the first direction;
   a second end plate located next to the plurality of cells on an opposite side of the plurality of cells from the first end plate; and
   a busbar module located on one side of the plurality of cells, the first end plate, and the second end plate in a second direction orthogonal to the first direction, wherein
   each of the plurality of cells includes a pair of external terminals,
   the busbar module includes a plurality of busbars configured to electrically connect the external terminals located adjacent to each other in the first direction, and a busbar case configured to hold the plurality of busbars,
   the busbar case includes a first end case that engages with the first end plate, a second end case that is located to be separate from the first end case in the first direction and that engages with the second end plate, and a connection portion configured to connect the first end case and the second end case to each other, and
   the connection portion includes a first expandable portion configured to be expandable in the first direction.

2. The energy storage module according to claim 1, wherein the first expandable portion is a hinge or a member in a shape of a flat spring.

3. The energy storage module according to claim 1, wherein the first expandable portion is a connection mechanism configured to allow a central case configured to connect to the first end case and the first end case to slide with respect to each other in the first direction.

4. The energy storage module according to claim 1, wherein the connection portion further includes a central case configured to connect to the first end case via the first expandable portion, and a second expandable portion configured to connect the central case and the second end case to each other and configured to be expandable in the first direction.

5. The energy storage module according to claim 4, wherein the second expandable portion is a hinge or a member in a shape of a flat spring.

6. The energy storage module according to claim 4, wherein:
   the central case includes a protruding portion protruding in the second direction; and
   the protruding portion is located between a pair of cells out of the plurality of cells.

7. The energy storage module according to claim 6, further comprising a center plate located between the pair of cells, wherein the center plate includes a central engaged portion that engages with the protruding portion.

8. The energy storage module according to claim 6, wherein the protruding portion is fitted between the pair of cells so as to contact the pair of cells.

9. The energy storage module according to claim 1, wherein:
   the first end plate includes a base extending in the second direction, and a retained portion extending in the first direction from the base and including a through hole extending in the second direction; and
   the first end case includes a columnar portion extending in the second direction and inserted through the through hole, and a retaining portion located at a distal end of the columnar portion and configured to retain the retained portion in the second direction.

* * * * *